March 21, 1967 L. J. NOWAK, JR 3,310,156
BI-DIRECTIONAL POWER FEEDING METHOD

Original Filed March 25, 1964 8 Sheets-Sheet 1

INVENTOR.
Leon J. Nowak, Jr.
BY Parker & Carter
Attorneys.

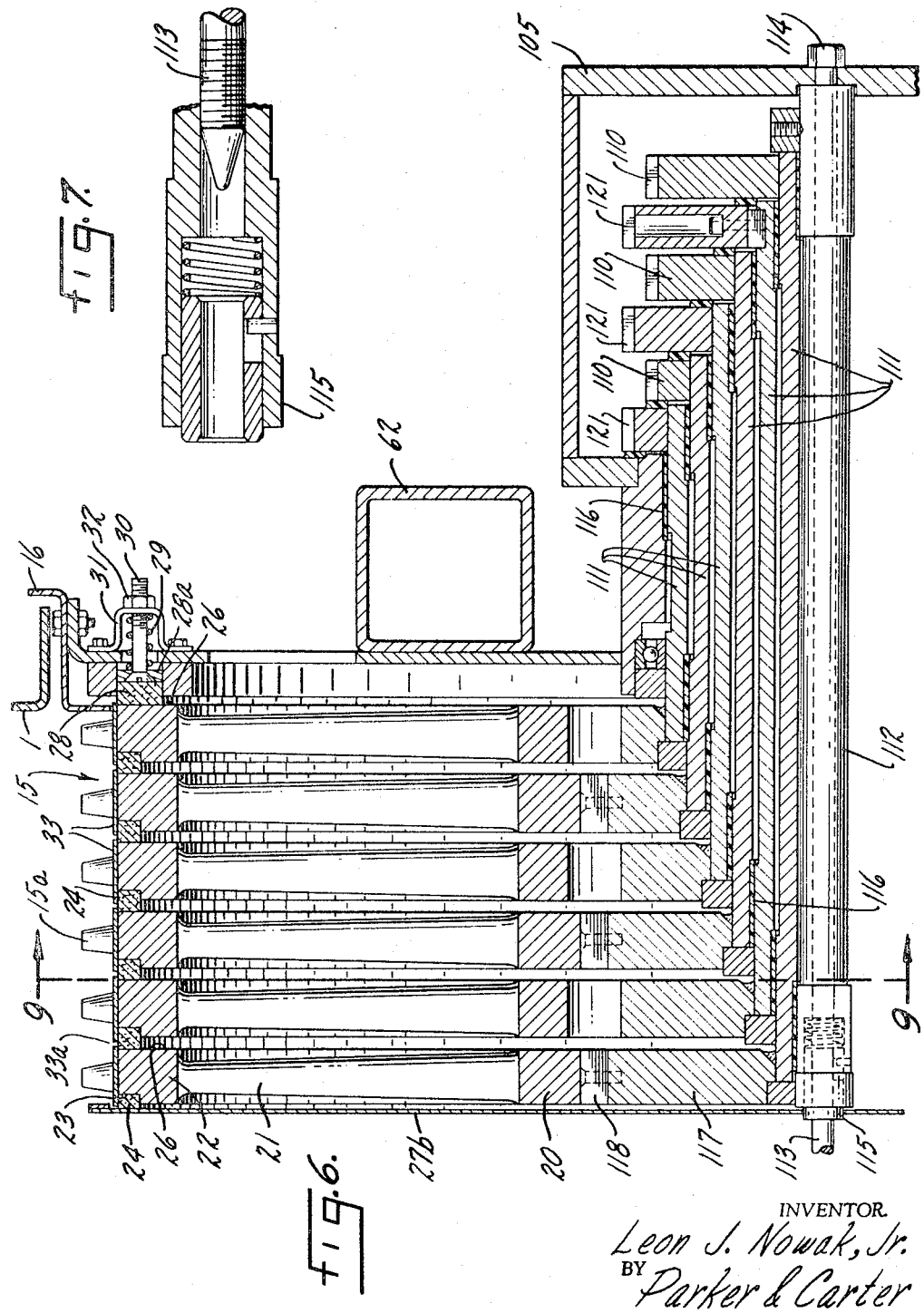

March 21, 1967  L. J. NOWAK, JR  3,310,156
BI-DIRECTIONAL POWER FEEDING METHOD
Original Filed March 25, 1964  8 Sheets-Sheet 7
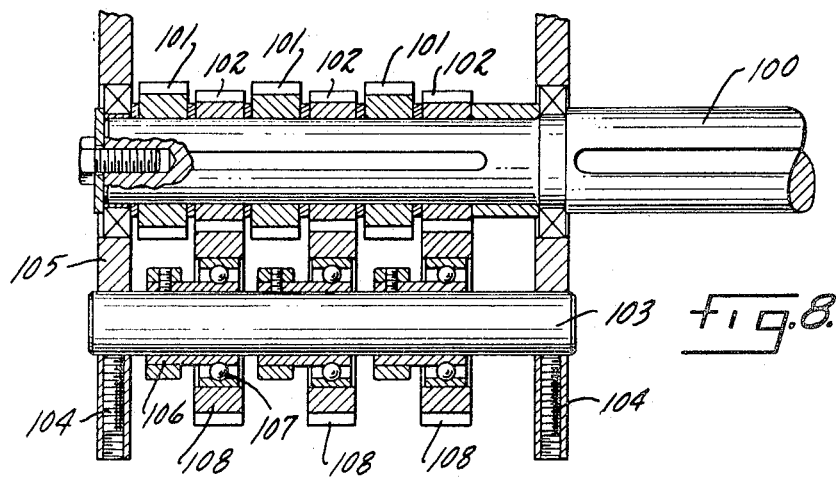
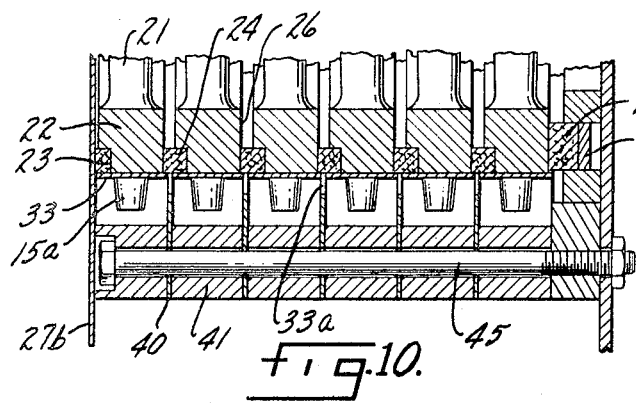
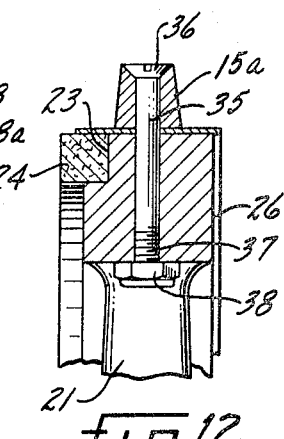
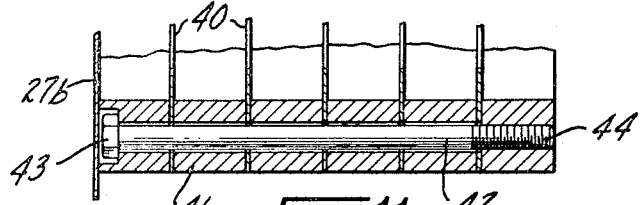
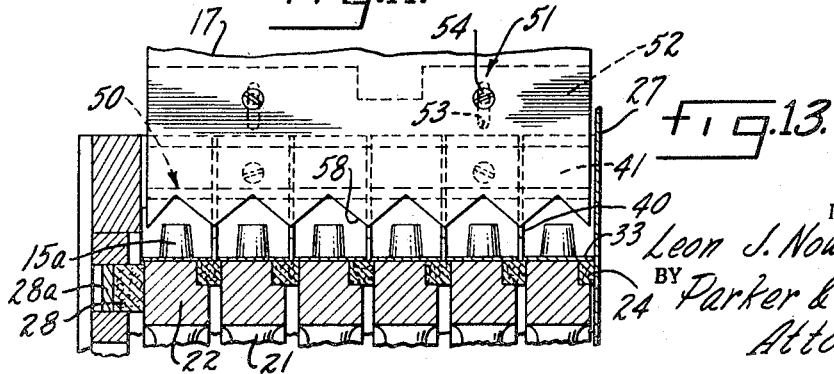
INVENTOR.
Leon J. Nowak, Jr.
BY Parker & Carter
Attorneys.

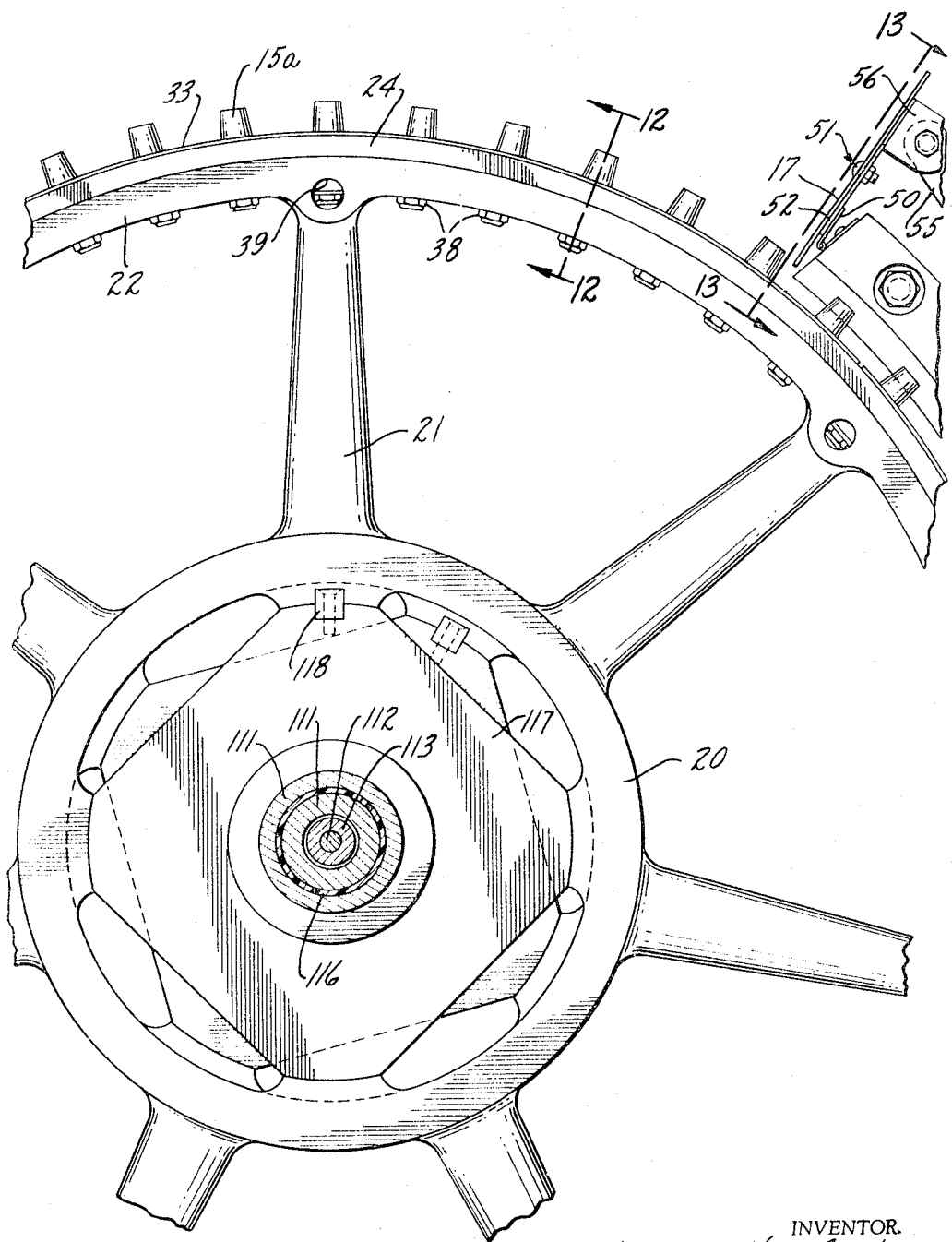

United States Patent Office 3,310,156
Patented Mar. 21, 1967

3,310,156
BI-DIRECTIONAL POWER FEEDING METHOD
Leon J. Nowak, Jr., Park Ridge, Ill., assignor, by mesne assignments, to Blaw-Knox Company, Pittsburgh, Pa., a corporation of Delaware
Original application Mar. 25, 1964, Ser. No. 354,699. Divided and this application Dec. 31, 1964, Ser. No. 435,766
10 Claims. (Cl. 198—62)

This application is a divisional application of co-pending application Serial No. 354,699, filed March 25, 1964, now Patent No. 3,253,743, for "Bi-Directional Power Feeding Device" which in turn is a continuation-in-part of application Serial No. 217,055, filed on August 15, 1962, now abandoned, for "Bi-Directional Power Feeding Device."

The invention relates to improvements in apparatus for feeding material and in methods of feeding materials. Broadly, the invention relates to a method and apparatus for providing a regulated, controlled flow of bulk materials of a nature rendering them difficult to handle.

One purpose is to provide a means and method for feeding matted or entangled or interlocking materials in a uniform stream.

Another purpose is to provide a method and means for handling bulky materials having poor flow characteristics having stringy, shredded or leafy characteristics, and with various conditions of moisture, particle size, and the like, which may tend to cause irregular flow characteristics.

Another purpose is to provide an improved feeding means or assembly for receiving a supply of divided material in the receiving zone and for moving the material from such receiving zone in opposite directions of removal.

Another purpose is to provide an improved feeding assembly which includes a plurality of wheels or rotary members, mounted for rotation about a generally identical axis, with the adjacent wheels or members rotatable simultaneously in opposite directions of rotation, whereby to subject the material handled to a positive removal from the receiving zone.

Another purpose is to provide a plurality of rigid, rimmed, circular, wheel-like members having material engaging, radially extending elements.

Another purpose is to provide adjustable means for regulating the flow of material withdrawn from a hopper in opposite directions.

Another purpose is to provide contoured conveying guides adjacent and at least broadly surrounding the circular feed members.

Another purpose is to provide an improved wheel-like feeding member.

Another purpose is to provide sealing means between adjacent circular feed members, formed and adapted to maintain a seal between adjacent members, during their simultaneous rotation in opposite rotational directions.

Another purpose is to provide an improved means and method for maintaining a predetermined pressure in the feed receiving zone.

Another purpose is to provide an improved method applying or method varying mechanism as operable against material in the feed receiving zone.

Another purpose is to provide improved supporting and driving means for the circular wheel-like feed members.

Another purpose is to provide improved means for simultaneously rotating a plurality of circular feed members, adjacent feed members being simultaneously rotated in opposite directions.

Another purpose is to provide improved supporting means for the feed members.

Another purpose is to provide improved means for delivering material to the feed receiving zone.

Typical examples of materials which fit the above description are asbestos, insulating material, hemp, some food products, and tobacco. Tobacco, particularly chewing tobacco which contains rum and molasses, is particularly difficult to separate into a substantially uniform flow prior to advancement to machines, such as weighers, where it is further processed. Up to the present time, hand sorting has been the most effective method of providing a uniform flow of chewing tobacco.

Accordingly, a primary object of the invention is a method of providing uniform flow of hard to handle bulk material, such as chewing tobacco, having stringy, shredded, leafy, or other characteristics which prevent it from being easily handled by conventional equipment.

Another object is a method of providing uniform flow of the above type of material which results in minimum breakage, and minimum bridging, packing and balling up of the material.

Yet another object is to provide a method of withdrawing material from a relatively dormant source of supply, such as a storage or supply hopper, and converting it into a regulatable flow of material suitable for further processing, such as collection in a net weigher.

Another object is a method of providing a regulated flow of stringy, shredded, leafy, or similar hard to handle bulk material in which an irregular source of supply is converted to a uniform flow by movement of adjacent portions of the material in opposite directions.

Yet a further object is to provide apparatus for accomplishing each of the above objects.

Another object is to provide an apparatus for converting a supply of leafy, stringy, shredded, or other hard to handle material, such as chewing tobacco, in a supply zone into a regulatable, uniform flow of material which may be discharged, and collected, if desired, at one or more discharge zones.

Yet a further object is to provide an apparatus having a plurality of aligned material conveying members, adjacent members moving in opposite directions and alternate members moving in the same direction, to thereby separate the material and convey contiguous, adjacent portions of it in the form of co-extensive moving currents which progress in opposed directions with respect to one another from a supply zone to a pair of discharge zones from which it may optionally be diverted to a final discharge zone, said discharge zones being remote from the region of co-extensive movement of the currents.

Yet another object is to provide a unique drive system for a bulk material feeder in which a plurality of progressively smaller hollow driving shafts are received one within the other, alternate of said driving shafts being driven in opposite directions at one end and driving adjacent material conveying members in opposite directions at the other end.

Other objects and advantages of the invention will become apparent upon a reading of the following description of the invention.

The invention is illustrated more or less diagrammatically in the accompanying drawings wherein:

FIGURE 6 is a section, on an enlarged scale, on the line 6—6 of FIGURE 4;

FIGURE 7 is a detail;

FIGURE 8 is a section, on an enlarged scale, on the line 8—8 of FIGURE 4;

FIGURE 9 is a section on the line 9—9 of FIGURE 6;

FIGURE 10 is a section, on an enlarged scale, on the line 10—10 of FIGURE 4;

FIGURE 11 is a section, on an enlarged scale, on the line 11—11 of FIGURE 3;

FIGURE 12 is a section on the line 12—12 of FIGURE 9; and

FIGURE 13 is a section on the line 13—13 of FIGURE 9.

Like parts are indicated by like symbols throughout the specification and drawings.

Figure 1:
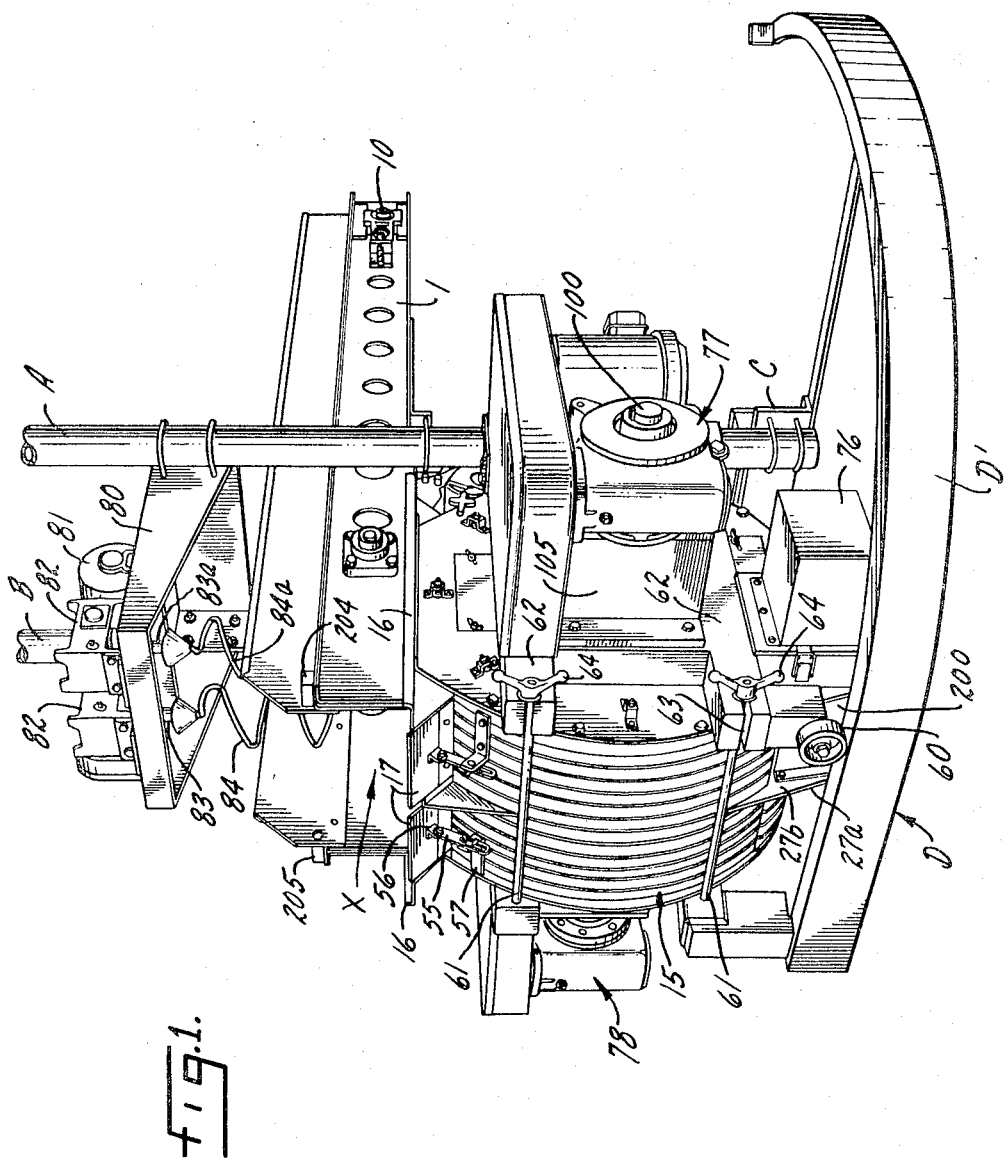
FIGURE 1 is a perspective view of the device in a condition of use.
Figure 2:
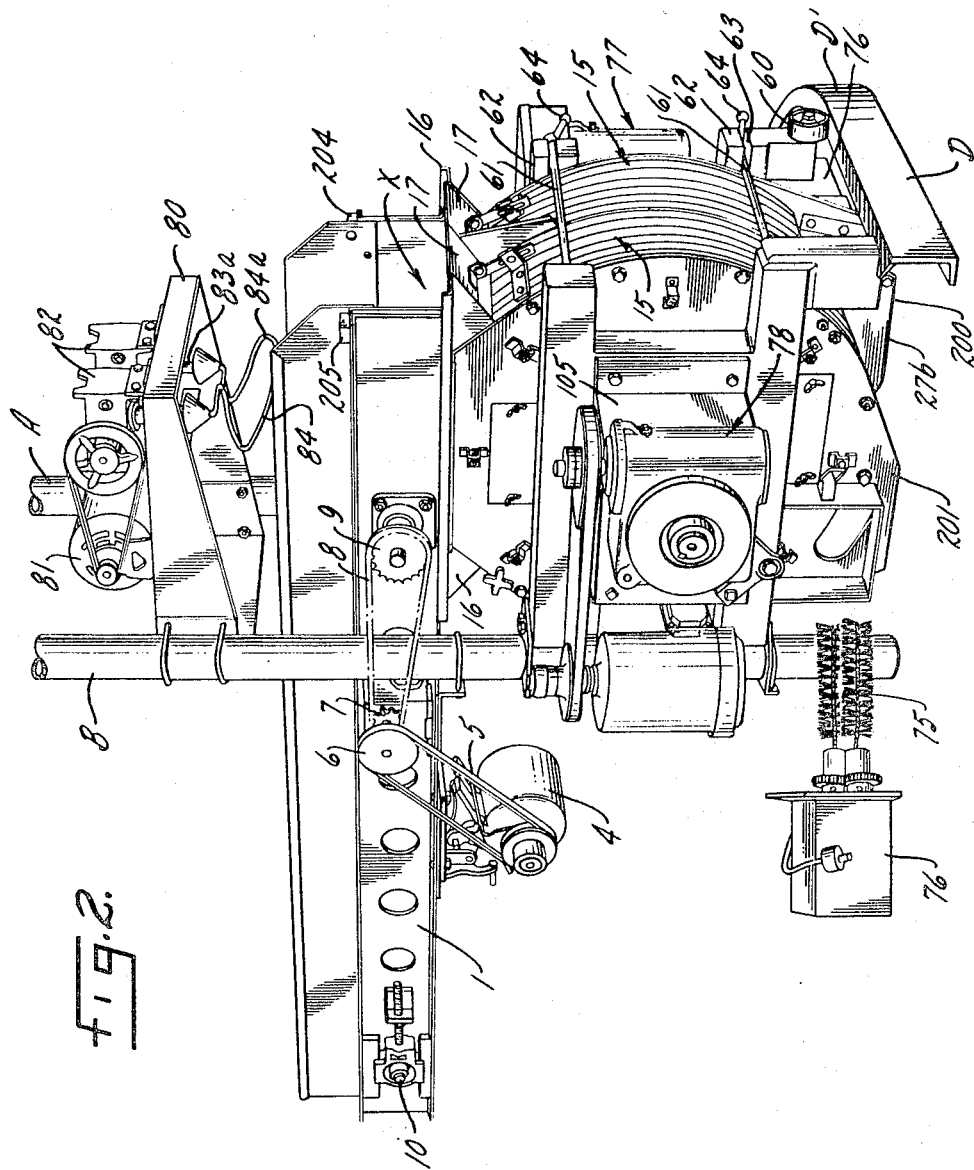
FIGURE 2 is a similar perspective taken from a different angle.

Referring to the drawings, and, for example, to FIGURES 1 and 2, I illustrate a frame or supporting structure shown as including two vertical supports A, B, which may be supported at their lower ends on any suitable supporting frame or surface, the details of which do not of themselves form part of the present invention. In the particular embodiment herein shown I illustrate a cross-frame C which is secured to members A and B. Secured or anchored in any suitable fashion is a frame member, generally indicated as D, which includes an arcuate section $D^1$, the purpose of which will later appear. Mounted, for example, on the vertical supports A and B, is a frame, generally indicated as 1, in which may be supported a suitable conveyor, for example, an endless conveyor. A conveyor belt is indicated, for example, at 2, see FIGURE 3, as extending about suitable rollers or pulleys, one of which is indicated at 3 in FIGURE 4. The pulley or roller 3 may be driven from a motor 4, shown in FIGURES 3 and 4 as supported in any suitable way on the frame 1. Through a belt 5 it drives a sheave and sprocket assembly 6, 7, which, in turn, through a chain 8, drives a sprocket 9 through which the roller 3 may be driven and, thus, the endless belt 2. 10 generally indicates any suitable adjustable idler or guide roller about which the opposite end of the belt 2 passes, see FIGURES 2 and 3. It will be understood that the belt 2 is driven in the direction of the arrow of FIGURE 4 and that the material carried by the belt is delivered thereby into a feed receiving area or space generally indicated X in FIGURE 4.

Underlying the feed receiving space X, I position a plurality of rotatable feed receiving wheels or feed elements which will later be described in detail. These are indicated at 15, for example, in FIGURE 3. For convenience I illustrate them arranged in two groups of six each. When the groups are in the operative position as shown in FIGURE 2 the groups abut and form the bottom closure of the feed receiving space X. The feed receiving space is further defined by hopper side walls 16 and hopper end walls formed by inclined adjustable plates 17. When the parts are in the position shown in FIGURE 2 they provide a hopper having opposite side walls 16 and end walls 17, the walls converging downwardly to define a space substantially closed by the upper arcs of the feeding members or wheels 15. Since each adjacent wheel, as will later be shown in detail, rotates in an opposite rotational direction the material in the feed receiving area X is subjected to the movement of the radial pins or projections 15a of the wheels 15, part of the material being drawn out from one side of the receiving space X and part from the opposite side.

Figure 3:
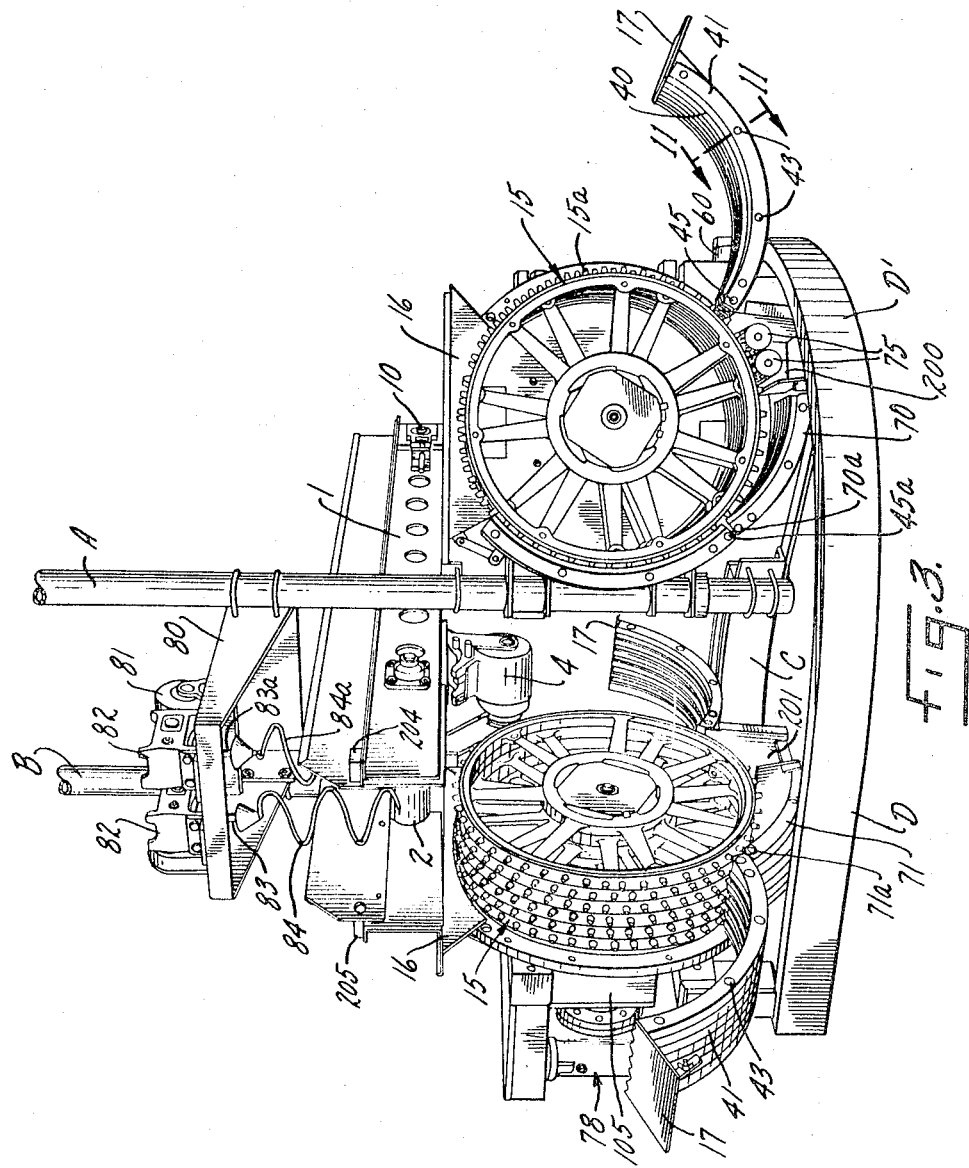
FIGURE 3 is a perspective view of the structure shown in FIGURE 1, with some of the parts omitted and others shown in a different position, whereby to show some of the normally concealed mechanism.

The individual wheels or feed members are shown in some detail, for example, in FIGURE 9. Each may include, for example, a hub 20 and a plurality of spokes 21, extending to a rim 22. Each such rim is circumferentially notched at one side, as at 23 in FIGURE 12, to receive a sealing ring or the like 24. These sealing rings or seals are preferably of a somewhat compressible material. It will be observed from FIGURE 6 that each of the rims 22 is notched at one side in such fashion as to hold the engaged seal 24 against a preferably plane surface 26 on the adjacent rims 22. In view of the fact that, as shown in FIGURE 3, the wheels 15 are arranged in a plurality of groups, of which one may be swung away from the other to the position shown in FIGURE 3, I find it advantageous to provide a separating plate or abutting plate 27b against which the seal 24, farthest to the left, referring to the position of FIGURE 6, abuts. Another separating plate 27a of substantially identical configuration to plate 27b forms the right side of the left wheel unit as viewed in FIGURE 5. It will be noted that plate 27a has been omitted from the left set of wheels in FIGURE 3, and the plate 27b and the first wheel from the right set of wheels in said figure, for purposes of clarity. Preferably, I direct pressure against each group of wheels in an axial direction, whereby each of the seals 24 is maintained under at least slight compression. As shown in FIGURE 6, I obtain this pressure by maintaining a thrust against a seal 28 which abuts the plane outer side of the rim 22 farthest to the right of FIGURE 6. It may be a felt ring. 28a is a steel pressure ring. 29 indicates any suitable coil spring surrounding the pin 30 and compressed within the stirrup 31. The thrust can be adjusted or limited as by the nut 32 screwthreaded upon the pin 30. I employ as many of these elements as is necessary and the end result is to obtain the seals 24 in compression. It will be noted, for example, from FIGURE 6, that I employ rim bands 33 which extend about the rims 22 and which are somewhat wider along axis, whereby to maintain a relatively slight separation between rim bands 33. Each such separation 33a is aligned with or closed by one of the seals 24 and the result is a firm seal between adjacent wheels, but without any binding or metal-to-metal contact.

Exterior to the rim bands 33 are the pins 15a. These pins 15a, as shown, for example, in FIGURE 12, may be held in position by rods 35, shown as having chamfered screw members 36, screwthreaded shanks 37 passing through appropriate apertures in the wheel rims 22, and lock nuts 38, most of which are accessible through the space between adjacent spokes 21. Those aligned with the spokes, as shown in FIGURE 9, are accessible through suitable apertures 39. Thus it will be seen that the material engaging pins 15a extend radially through the rims 22 and the rim bands 33 and can easily be applied or removed for wear or for any desired change in shape or dimensions of the pins.

Since each alternate wheel 15 rotates in an opposite direction it is advantageous to provide guides for, to some degree, confining the material or particles conveyed by each individual wheel. I therefore provide a system of guide channels, such as are shown in various positions in FIGURE 3. In FIGURE 3 the righthand unit, referring to the position of the parts as herein shown, is swung out into open or inoperative position. It will be understood that this unit is rotatably supported upon the support A by any suitable hinge structure, the details of which do not form part of the present invention. This unit is shown in its closed position, or operative position, in FIGURE 1. It includes a driving assembly, which will later be described, but it is enough to mention that this assembly, with its appropriate motor, is mounted to swing about the vertical support A and to carry with it the righthand group of wheels or feed wheels. One of the hopper side walls 16 swings with it, whereas the other remains preferably stationary in relation to the conveyor frame 1. The feed receiving space X, when the device is operating, is closed at one side by the fixed hopper wall 16 and on the other side by the movable hopper wall 16 which is shown in its operative position in FIGURE 1. The end walls, earlier indicated as 17, are mounted on guide channel structures, which I will now describe.

Referring now to FIGURES 3 and 11, each such structure is constituted in effect by a sandwich of arcuate sheets 40, separated by intermediate arcuate bars 41, each such group being secured together by a securing rod 42 so as to have a hex head or the like 43, and a screw-threaded end 44, which engages the end bar 41. This sandwich may be connected together by a plurality of the rods 42 and the unit is pivoted, for example at 45 or 45a, as shown in FIGURE 3. As will be clear from FIGURE 3, an identical unit may be used at each side of each of the wheel or feed member groups. These guide units, when in operative position, define each a channel for each wheel 15 or for each set of pins 15a. This relationship is indicated, for example, in FIGURE 10. One of the arcuate sheets 40 is aligned with the space between each adjacent pair of rims 22. It extends inwardly to overlap the pins 15a but not so far as to contact the rim bands 33. Since the arcuate bars 41 are spaced radially outwardly beyond the ends of the pins 15a, an independent guide channel is provided for each wheel 15 or for each set of pins 15a.

As a matter of convenience, I mount the end hopper walls 17 at the upper end of each of the above described guide channel assemblies. When the parts are assembled as shown in FIGURE 2 the ends of the feed receiving space X are thus closed by the downwardly and inwardly inclined hopper end walls. These end walls 17 operate as metering boards and are preferably adjustable both as to angle and as to approach to the wheels or feed members. As shown in FIGURE 9, each such metering board 17 is mounted on a hinge assembly 50 at the upper inner end of one of the above described channel guide assemblies. The meter board or hopper end wall 17 may be adjusted toward and away from the wheel by the adjustment shown at 51 in FIGURE 9. As shown in FIGURE 13, this adjustment may include slots 53 in the hinge plate 52 and suitable screws or pin-and-nut assemblies 54 which pass through the slots. The metering board 17, in turn, may be adjusted as to angle by the employment of slotted adjusting bars 55 pivoted to brackets 56 at the rear side of the metering board 17. These slotted bars, in turn, can be adjustably secured to supporting brackets 57, as shown in FIGURE 1. As will be clear from FIGURE 13, each metering board or hopper end wall terminates in an inner surface, shown in FIGURE 13 as a series of alternate teeth or notches 58. The notches clear the pins 15a and the intermediate teeth approximate generally to the inner edges of the arcuate plates 40.

When the righthand unit of FIGURES 1 and 3 is in its outer or inoperative position it is supported on the arcuate track or section D¹ by any suitable roller or rollers 60. When the parts are moved into the operating position the two sets of wheels may be clamped together by lock rods 61 which extend into notches 63 of frame members 62. The turn screws 64, screwthreaded on the ends of the rods 61, are effective firmly to lock the assembly together, with spacing plates 27a and 27b between them. When they are in this position it will be understood, of course, that all of the guide channel assemblies, most of which are shown in the open position in FIGURE 3, are locked back into their service positions. Each of them may be opened individually and independently of one another for cleaning. The side units are sufficiently far apart at their upper ends to leave the feed receiving space X open at the bottom. The two side units, pivoted at 45 and 45a, are separated by a distance which may be substantially equal to the length of the feed receiving space X. This bottom space is preferably closed by a similar but shorter guide channel assembly, which need not be described in further detail. One such assembly is shown at 70, pivoted at 70a in the righthand unit, and the other is shown at 71, pivoted at 71a in the lefthand unit. As will be seen from FIGURE 3, each one of the units 70 and 71 is substantially continuous with one of the side units or assemblies but terminates at a sufficient distance from the lower end of the opposite assembly to provide an adequate feed discharge opening. As will be observed from FIGURE 3, the feed discharge openings for the two groups of wheels or feed members are staggered, to provide two discharge apertures or zones which may be employed to discharge to separate receiving areas or separate receiving conveyors. No such conveyors are herein shown, since their details would not of themselves form part of the present invention.

I find it advantageous to provide cleaning brushes which may operate against the rim bands and pins of each set of feed members or wheels. A pair of such cleaning brushes is shown at 75 in FIGURE 3. Any suitable motor means and brush supports may be housed in and secured to the housing 76, see FIGURE 2, which swings with the frame member 62 of the righthand feed assembly. It will be understood that the reduction gear or drive unit, generally indicated at 77 in FIGURE 1, likewise swings about the support A, and a corresponding gear or unit 78 is fixed at the opposite side of the frame structure. Thus when the operator swings the righthand unit into the position in which it is shown in FIGURE 3 he swings about the vertical support A one half of the hopper structure, one half of the wheels or feed elements, one half of the guide channel structure, motor means for one half of the feed members or wheels, and, of course, the brushes 75 and the motor means therefor.

Figure 5:
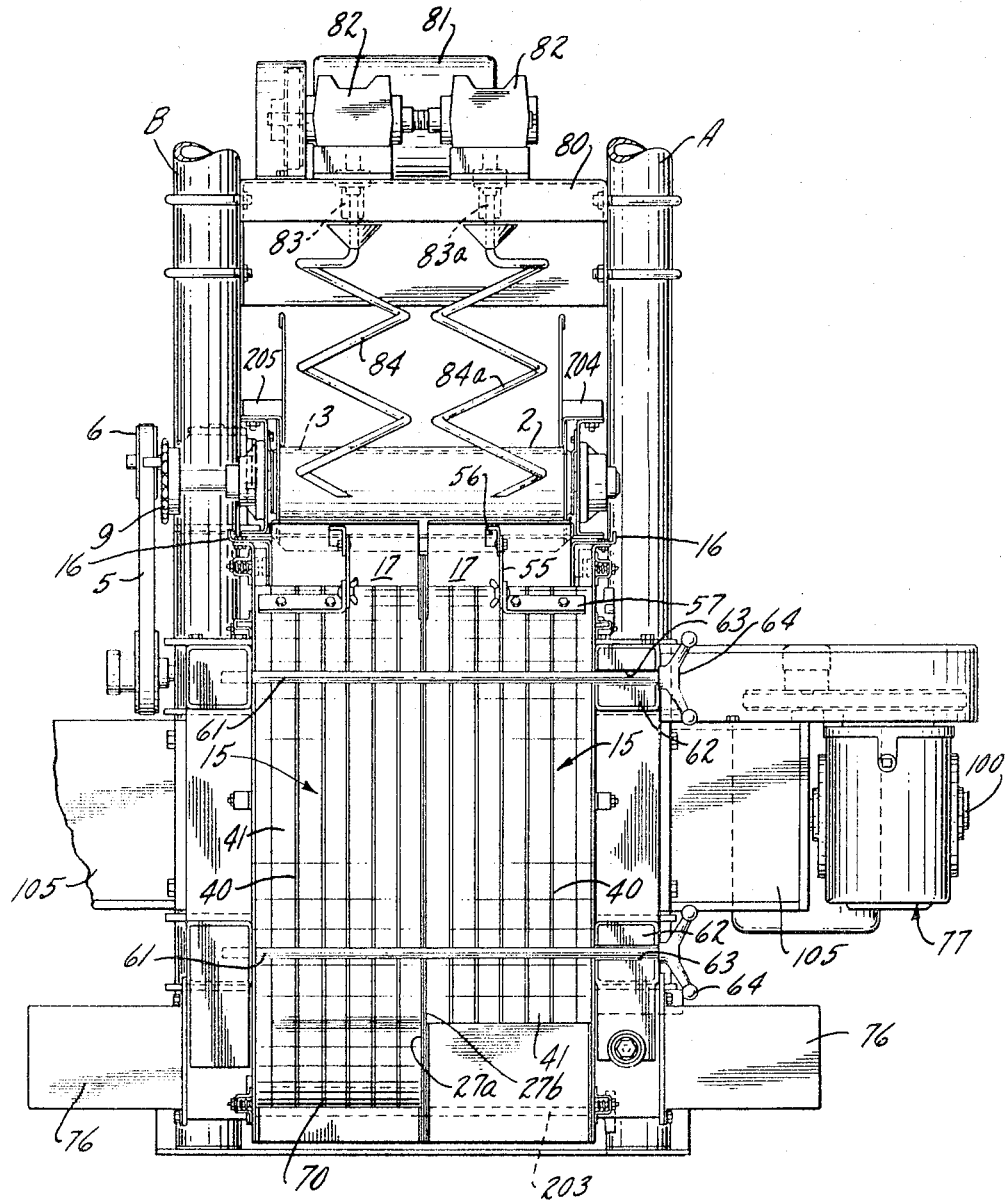
FIGURE 5 is an end elevation of the structure shown in FIGURE 4.

I find it important to control the pressure of the material in the feed receiving zone X against the arcs of the wheels which close the bottom of the above described hopper structure. Under some circumstances, possibly most circumstances, it may be advantageous to maintain some degree of downthrust of the material. On the other hand, under other circumstances, and with different materials, it may be advantageous to reduce the gravital downthrust. I illustrate, therefore, a structure which can be used either way. I show an upper support 80 which extends between and is secured to the vertical supports A and B. On this platform or support 80 I provide a single motor 81, with its appropriate gearing or gear reduction 82. Driven thereby are vertically axised shafts 83, 83a, each of which carries or terminates in a spiral 84 or 84a, herein shown as a spiraled rod terminating somewhat above the upper arcs of the wheels or feed members 15. The spirals are of opposite pitch, as best shown in FIGURE 5. Whereas a single such member might be satisfactory, I prefer to employ two, one located over each group of feed members or wheels.

In considering the operation of the device, assume that the material to be fed or handled is being moved in predetermined quantities or at a predetermined rate by the endless belt 2. As will be clear from FIGURE 4, the material falls from the belt downwardly into the feed receiving space, generally indicated as X. Downwardly into this space extend the spiraled rods or spiraled elements 84 or 84a. If no downthrust is necessary they need not be rotated, or may even be removed. But assume that some downthrust of the material against the peripheries of the wheels 15 is considered advantageous, then the motor 81 is actuated and the spirals 84, 84a, by their rotation, direct a downward thrust against the material which urges the material with a force greater than gravity against the wheels 15. On the other hand, if very heavy material is involved, and it is desired to reduce the downward gravital pressure, any suitable means may be employed either to reverse the rotation of the motor 81 or to reverse the driving units 82, whereby to rotate the spirals 84, 84a to lift the material upwardly.

Whether or not the spirals are employed, the material in the feed receiving plates X thrusts downwardly against the upper arcs of the wheels 15 and is directed downwardly through the above described hopper formed by the walls 16 and 17. Since each alternate wheel moves in an opposite direction the material to be handled is moved by the pins 15a into the guide channels, such as are shown in FIGURE 10, the material associated with each wheel forming in effect a moving current of material. It will be noted that the contour of the path of travel of each moving current is fixed in the region of co-extensive movement of the currents irrespective of the existence of variable pressures which may be present within the mass, due in this instance to the rigidity of the wheels 15. This is of importance by ensuring that lumps of material are exposed to a maximum separation effect, particularly the upper portions thereof, as contrasted to the uneven separation effect which would result from a flexible or depressable carrying surface 33. The movement of the material into the guide channels may be, to some degree, controlled by adjustment of the meter boards or hopper end walls 17, either as to angle, or as to clearance from the wheels, or as to both. In any event, each of the wheels 15, with its appropriate pins or points 15a, moves the material along one such channel and downwardly across the lower channel unit 70 or 71 to the appropriate discharge aperture.

Figure 4:
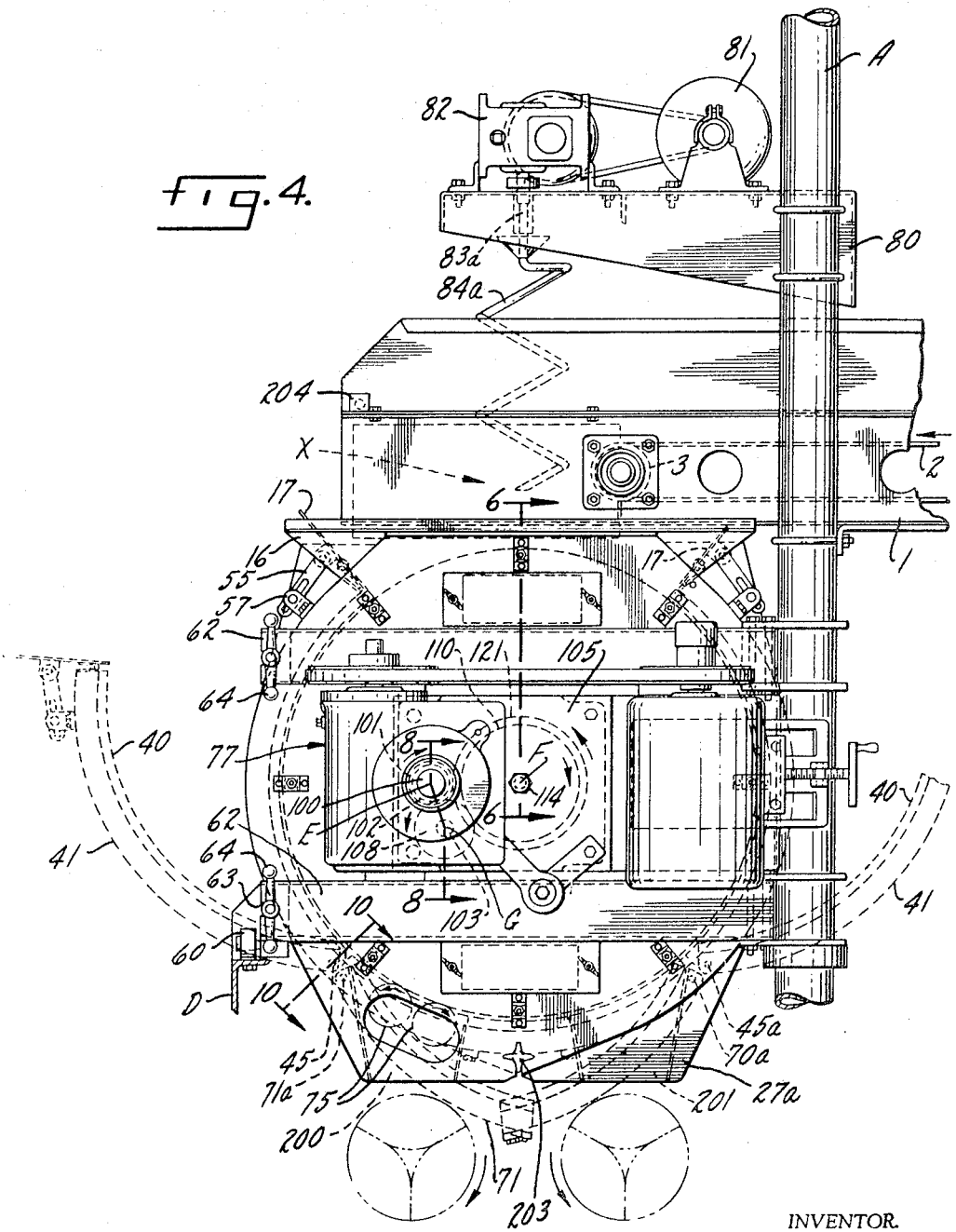
FIGURE 4 is a partial side elevation of the structure shown in FIGURE 1.

For cleaning the channels and the outer surfaces of the feed wheels, the side units or segments can be swung into the dotted line position in which they are shown in FIGURE 4. The bottom units 70, 71 can be swung into the position in which they are shown in FIGURES 3 and 4, for cleaning. The rim bands and pins are then accessible substantially throughout their circumferences. However, even during use they are subjected to the cleaning action of the above mentioned brushes 75. These brushes are normally in position against the peripheries of the feed wheels during operation of the devices. They may be removed, as shown in FIGURE 2, for cleaning, or if not needed. The housing 76 contains any suitable motor which may be connected into any suitable circuit. As a matter of fact, the brushes 75 have a triple function. By their rotation they clean the exteriors of the feed wheels and, also, the projecting pins. Possibly even more important is their second function, of breaking up lumps and entangled or matted particles. As will be clear from the figures, they operate in counter-rotation. Their peripheral speed is considerably higher than the surface speed of the wheels or feed members. A third function is to smooth out or regulate the flow of material and to eliminate the pulsations caused by the separation between pins. As will be clear from FIGURE 4, the brushes are in the line of flow of the delivered material to whatever weighing or handling means may be employed. Hence the importance of the last two of the above functions.

As above referred to, the two groups of wheels or feed members, when in the operative position, abut and can be thought of as a single group. Any suitable drive means may be employed for rotating each adjacent pair of wheels or feed members in an opposite rotational direction about a common axis. Since I employ two separate groups of feed members which may be separated for access and cleaning, as shown in FIGURE 3, I employ a separate drive for each group. This involves employing the individual drive units 77 and 78, each such motor driving a separate motor shaft. One of these shafts is shown at 100 in FIGURE 8 and has keyed upon it a plurality of pinions 101 of maximum diameter and 102 of minimum diameter. Parallel with it, as shown, for example, in FIGURE 8, is a fixed shaft 103 which may be held, for example, by screws 104, in appropriate seats in a side frame or gear box portion 105. Fixed on the shaft 103 are sleeves 106 which form interraces of bearing elements 107 about which rotate idlers 108. Each such idler is in mesh with one of the pinions 102, of minimum diameter, on the shaft 100. Each such idler is also in mesh with an appropriate gear 110 along one of the concentric sleeves 111. These concentric sleeves surround a fixed central shaft 112 shown as axially apertured and as having within it a center lock shaft 113 having a hex head or the like 114 exteriorly abutting the side housing member 105. As will be clear from FIGURE 6, each of the earlier described wheel units has an axial shaft 112 surrounded by six of the sleeves 111, each such sleeve being provided with suitable bearing elements or end sleeve inserts 116. Thus the six shafts each rotate freely about the sleeve 112 and in relation to the other adjacent sleeves 111. Each such sleeve carries on it a squared drive member 117, each such drive member being surrounded by one of the hubs 20 and being held against rotation in relation to it, for example, by any suitable key or the like 118, as shown, for example, in FIGURE 9.

It will be understood that, as shown in FIGURE 4, the drive shaft 100 centers at E. The shaft 112 centers at F. The idler shaft 103 centers at G. With reference, for example, to FIGURE 8, each of the pinions 101 engages one of the gears 121 on one of the sleeves 111. These counterclockwise rotated gears are shown as of larger diameter than the clockwise rotating gears 110 which mesh with the idlers 108. Thus, in response to rotation of the appropriately driven shaft 100, all six of the sleeves 111 are rotated, three of them directly driven from the shaft 100 and three of them indirectly driven through idlers. Whereas I have shown only one set of sleeves 111, it will be understood that a similar structure is employed for each of the sets of six wheels.

As will be clear from FIGURE 5, the division plates 27a and 27b between the two units are in position during the normal use of the device. These intermediate plates do not appear in FIGURE 3, since FIGURE 3 shows the device in open or access position. As will be clear from FIGURES 6 and 7, the plate 27b, when the parts are open, is kept in position by a thrust element or sleeve 115. In FIGURE 7 the center rod 113 is shown out of position but it will be understood that it passes all the way through both parts and, of course, through the separating plates 27a and 27b. It will also be noted that plates 27a and 27b are two separate but identically shaped plates, as is indicated most clearly in FIGURES 4 and 5. The plates 27a and 27b serve multiple functions. They separate the two feed units, and each serves as one side of the chute associated with each set of wheels. They also serve to lend support to the drive mechanism.

It will be realized that whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic rather than as limiting me to my precise showing.

For example, any suitable means may be employed for controlling the delivery of material to the feed receiving space above the feed members. I illustrate a light-responsive control including a light source and a light-sensitive cell, the light to the cell being interrupted by the predetermined increase in the bulk or level of fed material in the space above the circular feed members. Such means are indicated diagrammatically at 204 and 205 in FIGURES 1 to 5. It will be understood, of course, that any other suitable indicator and control means may be employed to vary the operation or the rate of operation of whatever means are employed to deliver the feed above the circular feed members, the present showing to be taken as generally diagrammatic as to details, direction and location.

The use and operation of the invention are as follows:

I illustrate a simple and compact means for handling difficult materials, such as tobacco and the like. However, it applies to any materials having irregular flow characteristics or being matted or entangled or impregnated or coated or saturated with liquids, viscous material, or the like.

In the structure illustrated, for example, in FIGURE 1, I have shown a compact installation which may, if desired, be supported upon or suspended upon vertical supports A and B. It is advantageous to suspend the structure to leave clearance beneath the assembly for the weighing buckets, discharge hoppers, and the like. The installation may for example, be carried from ceiling beams, not herein shown, by rod or tube supports, shown at A and B, the frame D, D¹ being therefore substantially above the floor, or equipment supported on the floor. Where feeding to bags, packages or the like I may, for example, position a bagging machine or a packaging machine, or a supporting table, beneath the structure shown in FIGURE 1. Any suitable discharge hoppers may be employed, and any suitable weigh buckets, which receive material from the separate outlet chutes shown, for example, at the bottom of FIGURE 4, at 200 and 201. It will be understood that the details of the weigh buckets, discharge hoppers, bagging or packaging machines, etc., do not of themselves form part of the present invention. However, my employment of two sets of material handling and feeding wheels, each set supplying to a separate outlet, is adaptable to a receiving installation including a plurality of weigh buckets and a plurality of hoppers or conveyors, which feed to any desired bagging or packing machine, the details of such bagging or packaging machinery not forming of themselves any part of the present invention.

When the parts are in the position in which they are shown in FIGURE 1 the material fed by any suitable conveyor, for example, the endless conveyor 2 mounted on the frame 1, delivers material to the feed receiving space above the two sets of wheels, indicated at X in FIGURE 4. Alternately, and perhaps most often, the wheel units 15 will not be used with the particular conveyor illustrated in FIGURE 1. Since each alternate wheel of each set rotates in the opposite direction separate streams of material are carried by the guide channel units or concaves and are delivered to the bottom fixed chutes 200 or 201. The material delivered by one chute passes to one weigh bucket, or its equivalent, and the material delivered from the other chute passes to another. The weighed charges are received in any suitable discharge hopper conveying device, and, precisely weighed and ready to bag, are delivered to the appropriate packaging or bagging equipment.

The pressure within the feed receiving space X can be controlled by rotating the spiral rods 84 or 84a in the appropriate direction either to increase or diminish pressure, or the rods may be altogether remote, if their use is not necessary. The hopper formed by the side walls 16 directs the material to the feeding elements or wheels 15. The end walls, as earlier mentioned, are in the form of adjustable metering baffles which can be radially adjusted, or adjusted as to angle, or both.

The guide channel assemblies or concaves are all readily removable, but each has a plurality of channel spaces aligned with the material engaging pins 15a of each of the feed members or wheels 15. The cleaning brushes 75 for each unit are normally in contact with the wheels but can be readily withdrawn for cleaning, as shown in FIGURE 2.

I will not describe the frame structure in meticulous detail, but it may be understood from the drawings and their earlier description that, for access, the guide channel concaves, which are all pivoted, can be swung into the open position in which they are shown, for example, in FIGURES 3 and 4. Likewise, one unit can be swung about the supporting rod or tube A, to leave the entire interior of the feeding device exposed, as in FIGURE 3.

I have not illustrated the connections for the motors, but they may be electrically actuated, and any suitable conductive connection may be made with any suitable source of electric power. Suitable switches or controls may be employed whereby to connect or disconnect the individual motors with such source of power. Actually, I have illustrated a motor 4 for the endless conveyor 2, one motor 81 for the coiled rods 84 and 84a, individual drive units 77, 78 for the two sets of feed elements or wheel, and individual motors 76 for each set of cleaning brushes 75.

I claim:

1. In the method of forming an even, uniform flow of material which has inherently poor flow characteristics, such as fibrous material, the steps comprising
   delivering a supply of the material to a receiving zone,
   imparting movement in opposite directions to side by side portions of the material to thereby form streams of material which progress in opposed directions with respect to one another,
   each moving stream of material following a fixed path of travel throughout the region of side by side stream movement, and
   discharging each moving stream of material at a point along its path of travel which is remote from the region of side by side movement of the currents.

2. The method of claim 1 further including the step of varying the pressure of the material in the receiving zone during the removal of the streams of material from the zone to thereby maintain a desired pressure different from the normal gravital pressure of the material in the receiving zone.

3. The method of claim 2 further characterized by and including the step of
   increasing the pressure of the material in the receiving zone to above gravital pressure.

4. The method of claim 2 further characterized by and including the step of
   reducing the pressure of said material in the receiving zone to less than normal gravital pressure.

5. The method of claim 1 further characterized in that each moving stream of material has, in the region of side by side movement of the streams, both a horizontal and vertical component of movement on either side of its midpoint.

6. The method of claim 5 further including the steps of
   forming a plurality of moving streams of material in each direction, and
   discharging the streams moving in the same direction in a single continuous stream.

7. The method of claim 1 further including the step of limiting the maximum thickness of each moving stream of material along that portion of its path of travel beyond the region of side by side movement of the streams by maintaining, at the edge of the region of side by side movement, a fixed abutment means disposed in opposition to the movement of each stream at a distance spaced away from the bottom of the moving stream of material a distance corresponding to the desired maximum stream thickness.

8. The method of claim 1 further including the step of maintaining each moving stream of material separate from adjacent streams moving in the same direction between the region of side by side stream movement and the discharge path.

9. The method of claim 5 further including the step of maintaining each moving stream of material separate from adjacent streams moving in the same direction between the region of side by side stream movement and the discharge path.

10. The method of claim 1 further including the step of smoothing each moving stream of material by applying a member to the outermost surface of the stream which moves in a direction opposite to the direction of movement of the stream,
    the application of the oppositely moving member being at a location downstream from the region of side by side movement, but upstream from the discharge point.

References Cited by the Examiner

UNITED STATES PATENTS

| | | | |
|---|---|---|---|
| 1,141,899 | 6/1915 | Merritt | 222—236 |
| 1,559,266 | 10/1925 | Liberman | 131—109 |
| 1,705,012 | 3/1929 | Grupe | 131—109 |
| 3,119,518 | 1/1964 | Eschenburg et al. | 222—236 X |

FOREIGN PATENTS 887,496  1/1962  Great Britain.

EVON C. BLUNK, *Primary Examiner.*

SAMUEL F. COLEMAN, *Examiner.*

R. E. KRISHER, A. C. HODGSON, *Assistant Examiners.*